US005115862A

United States Patent [19]

Hastings

[11] Patent Number: 5,115,862

[45] Date of Patent: May 26, 1992

[54] ELECTRICAL GROUNDING DEVICE FOR WELLS

[76] Inventor: Phillip J. Hastings, 135 Woodview Dr., Cottage Grove, Wis. 53527

[21] Appl. No.: 564,268

[22] Filed: Aug. 8, 1990

[51] Int. Cl.[5] ........................ E21B 41/00; H02G 9/00

[52] U.S. Cl. .................................. 166/65.1; 166/75.1; 174/38; 174/47; 174/51; 439/95; 439/97

[58] Field of Search ........................ 166/65.1, 75.1, 68, 166/105, 113; 439/709, 800, 801, 814, 95, 97, 100, 194; 174/38, 47, 51, 99 R; 138/108

[56] References Cited

U.S. PATENT DOCUMENTS

| | | | |
|---|---|---|---|
| 796,797 | 8/1905 | Blackburn . | |
| 1,505,314 | 8/1924 | Cox . | |
| 1,941,905 | 1/1934 | Mair | 439/97 |
| 2,310,757 | 2/1943 | Wagner | 103/1 |
| 2,679,993 | 6/1954 | Christopherson | 248/27 |
| 2,829,190 | 4/1958 | Comlossy, Jr. | 174/47 |
| 2,937,227 | 5/1960 | Selnau | 174/84 |
| 3,652,779 | 3/1978 | Grinols . | |
| 4,027,094 | 5/1977 | Philips | 174/51 |
| 4,738,628 | 4/1988 | Rees | 439/95 |

OTHER PUBLICATIONS

Wisconsin Electrical Code Water Well Wiring.

*Primary Examiner*—Bruce M. Kisliuk

*Attorney, Agent, or Firm*—Andrus, Sceales, Starke & Sawal

[57] ABSTRACT

An assembly for securing a pump ground wire to the interior of a well casing comprises a support member adapted for placement into the well casing at its upper end. The support member is suspended within the well casing by a pair of suspension members having lateral tabs for resting on top of the well casing. A ground connection system is provided for establishing a ground connection between the pump ground wire and the well casing without connection to the exterior of the casing and without forming an opening in the well casing. Various embodiments are illustrated for establishing the ground connection between the ground wire and the well casing, utilizing the support member for achieving the ground connection.

9 Claims, 1 Drawing Sheet

ELECTRICAL GROUNDING DEVICE FOR WELLS

BACKGROUND AND SUMMARY

This invention relates to a device for use in a well for connecting the ground wire from a submersible well pump to the well casing.

In a well system, it is desirable to connect the well pump to the ground of the main electrical system. In many states, grounding of the well pump is required by the state electrical code. In Wisconsin, for example, the state electrical code specifies that the motor frame of the submersible well pump must be grounded by an equipment grounding conductor, which must be bonded to the metallic well casing.

One system for bonding the ground wire to the well casing involves drilling a hole in the well casing toward its upper end and tapping the hole. A grounding stud is then threaded into the tapped hole, and is used to establish a grounding connection between the well casing and the ground wire. A disadvantage to this system is that the procedure for drilling and tapping the hole into the well casing is carried out after the casing is installed, making the enumerated steps somewhat difficult to carry out. Additionally, piercing the well casing adversely affects the overall integrity of the casing. Further, sanitary problems can result from drilling a hole into a well casing due to outside water and other fluids entering the casing through the hole.

The present invention has as its object to provide an assembly for establishing a ground connection between the well casing and a ground wire without the need for drilling and tapping a hole in the well casing. Another object of the invention is to provide a system for establishing a ground connection which is simple in construction and easily installed at the upper end of the well casing, and which can be removed from the well casing.

In accordance with the invention, an assembly for connecting a ground wire to a well casing generally comprises a removable support member for placement into the casing toward its upper end, and means for fixing the position of the support member relative to the well casing. Ground connection means is engagable with the support member for establishing a grounding connection between the ground wire and the interior of the well casing without connection to the exterior of the well casing. The dimensions of the support member are in all respects less than the internal transverse dimension of the well casing, for allowing placement of the support member into the interior of the well casing. The support member is preferably provided with a pair of opposed suspension members, each of which includes a lateral tab, with the tabs being adapted to rest on top of the well casing for suspending the support member within the well casing.

In one embodiment, the support member extends radially between the suspension members. A threaded member extending through a threaded opening in one of the suspension members, and engagable with an interior surface of the well casing to secure the support member to the well casing. The threaded member also establishes a ground connection between the support member and the well casing. A threaded stud or the like is mounted to the other of the suspension members. A nut is engagable with the threaded stud, for connecting the ground wire to the threaded stud and establishing a ground connection to the well casing through the support member and the suspension members.

In another embodiment, the support member comprises a ring adapted for placement into the well casing, from which the suspension members extend upwardly. The suspension members and tabs fix the vertical position of the support ring relative to the well casing, while allowing lateral movement of the support ring. The ground wire is positioned between a surface of the support ring and an interior surface of the well casing, and lateral movement of the support member is caused by wedging means which bears between an interior surface of the well casing and a surface of the support ring substantially opposite the location of the grounding wire. The wedging means is operable to cause lateral movement of the support ring toward the well casing, to wedge the grounding wire between the support ring and the well casing and to establish a grounding connection of the ground wire to the well casing. The wedging means preferably comprises a screw engagable with a threaded opening formed in the support ring. Turning down the screw results in its end engaging the wall of the casing, causing movement of the support ring toward the ground wire.

In yet another embodiment, the support member comprises a ring, from which the suspension members extend upwardly. A series of openings are formed in the ring, and self-tapping screws or the like extend through the openings and bear at their ends against the interior surface of the well casing for fixing the position of the ring. A set screw extends through a threaded opening in the ring, and its inner end engages the grounding wire to force it against the inner surface of the well casing to establish a ground connection.

Various other objects, features and advantages of the invention will be made apparent from the following description of the invention taken together with the drawings.

BRIEF DESCRIPTION OF THE DRAWINGS

The drawings illustrate the best mode presently contemplated of carrying out the invention.

In the drawings.

DETAILED DESCRIPTION OF THE INVENTION

Figure 1:
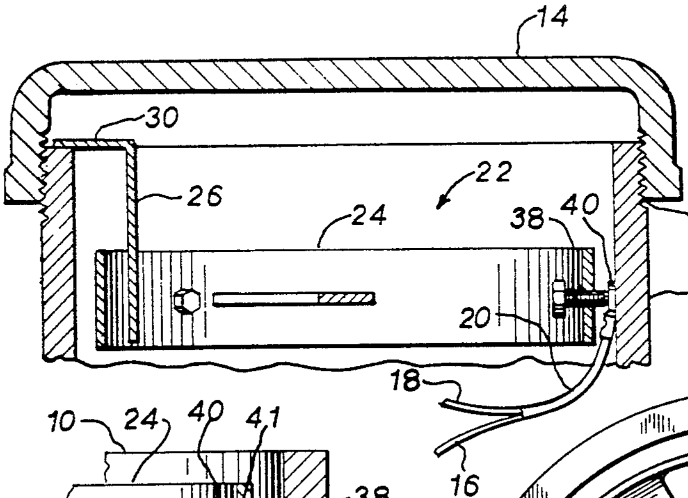
FIG. 1 is a section view through the upper end of a well casing, showing the grounding assembly of the invention in position within the well casing, with reference being made to line 1—1 of FIG. 2.

FIG. 1 illustrates a well casing 10 provided with threads 12 at its upper end, which is adapted to receive a threaded well cap 14, all as is known. Alternatively, any other well cap structure known in the art may be employed, e.g. a compression well cap, and the invention described hereafter is not limited to the particular well construction illustrated.

A submersible pump (not shown) is located toward the lower end of well casing 10.

A ground wire 16 is connected at one end to the frame of the pump motor. A ground wire 18 merges with pump ground wire 16 into a single wire 20, which is adapted to be connected to well casing 10 in compliance with electrical codes, as explained previously. Ground wire 18 extends through well cap 14 and is adapted for connection to the ground of the main electrical supply.

Figure 2:
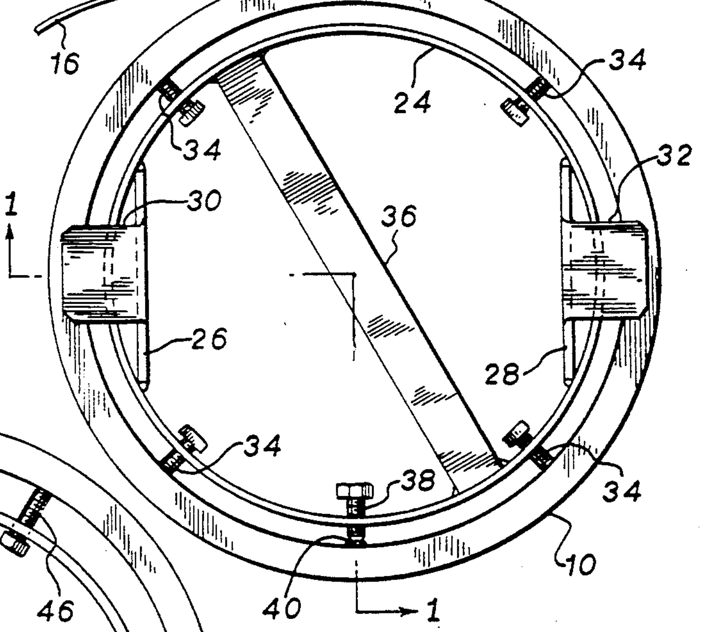
FIG. 2 is a top plan view of the assembly of the invention in position within the upper end of the well casing, as shown in FIG. 1, showing the support member in the form of a ring and with set screws fixing the position of the support member within the well casing.

A grounding assembly 22 is located in the upper end of well casing 10 for establishing a ground connection between wire 20 and well casing 10. Grounding assembly 22 generally includes a ring-like support member 24 and a pair of suspension members 26 and 28 (FIG. 2). Suspension members 26 and 28 are provided with laterally extending tabs 30 and 32, respectively, at their upper ends.

Support member 24 is in all transverse dimensions less than the internal diameter of well casing 10, allowing support member 24 to be placed within well casing 10. Tabs 30 and 32 are adapted to engage and rest on the upper end of well casing 10, to suspend support member 24 within casing 10.

Referring to FIG. 2, support member 24 is provided at several locations around its circumference with openings, and a series of self-tapping screws 34 are engagable with the openings formed in support member 24. The term "self-tapping screw" is intended to refer to any type of threaded screw or bolt designed to form a reliable grounding connection between grounding assembly 22 and well casing 10. Screws 34 thread into the openings formed in support member 24, and their outer ends engage and bear against the inner surface of well casing 10 at locations corresponding to the locations of the openings in support member 24 to form a grounding connection of support member 24 to well casing 10. In this manner, the vertical position of support member 24 is first fixed by tabs 30 and 32 on suspension members 26 and 28, and the lateral position of support member 24 is fixed relative to casing 10 by screws 34.

A reinforcing bar 36 extends diametrically within the interior of support member 24, and is welded at its ends to the inner surface of support member 24 for reinforcing and strengthening support member 24.

After support member 24 is fixed to casing 10 as described above, a set screw 38, which is engaged with a threaded opening formed in support member 24, is turned down so as to move toward the inner surface of casing 10. A connector member 40, which is connected to the end of ground wire 20, is aligned with set screw 38 and positioned between its end and the inner surface of casing 10. Set screw 38 is turned down until its end engages connector member 40 and secures connector member 40 against the inner surface of casing 10, so as to provide an electrical connection between casing 10 and connector member 40.

With the arrangement as described above, grounding assembly 22 acts to provide a structure which allows an electrical connection to be established between ground wire 20 and the interior of casing 10 without drilling and tapping a hole in casing 10, and without any connection to the exterior of casing 10.

Figure 3:
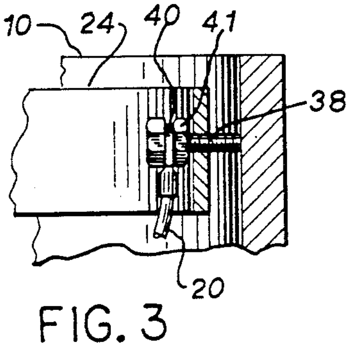
FIG. 3 is an enlarged partial sectional view showing an alternate construction for establishing a ground connection between the ground wire and the well casing.

An alternative arrangement for establishing a ground connection between ground wire 20 and well casing 10 is shown in FIG. 3. In this embodiment, connector member 40 is provided with an opening and set screw 38 is inserted therethrough. A lock nut 41 is engaged with the threads of set screw 38, and connector member 40 is sandwiched between lock nut 41 and the head of set screw 38.

Figure 4:
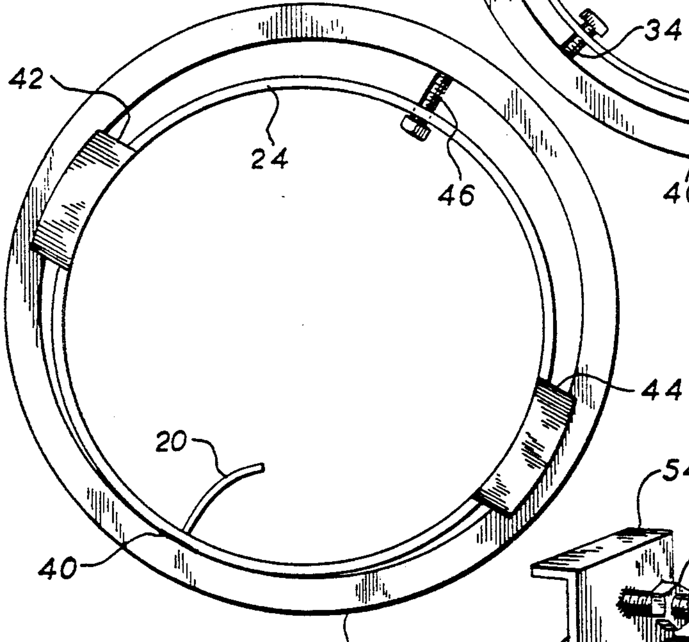
FIG. 4 is a view similar to FIG. 3, showing an alternate embodiment of the invention in which the ground wire is wedged between the inner surface of the well casing and the outer surface of the support member.

Another embodiment of the invention is illustrated in FIG. 4. In this embodiment, support member 24 is constructed similarly to that as illustrated in FIGS. 1 and 2. A pair of suspension members extend upwardly from support member 24, and a pair of tabs 42, 44 act to suspend support member 24 within casing 10. An elongated set screw 46 is engaged with a threaded hole formed in support member 24, and is movable toward the inner surface of casing 10. In this embodiment, connector member 40 at the end of ground wire 20 is positioned between the inner surface of well casing 10 and the outer surface of support member 24 diametrically opposite the location of set screw 46. As set screw 46 is turned down in the threaded opening formed in support member 24, it acts to move support member 24 away from set screw 46 and toward the inner wall of well casing 10 opposite therefrom. This action wedges or sandwiches connector member 40 between the outer surface of support member 24 and the inner surface of well casing 10 an amount sufficient to establish a grounding connection between connector member 40 and well casing 10. With this arrangement, the positioning of set screws as illustrated and described with reference to FIG. 2 is eliminated.

A reinforcing bar such as 36 in FIG. 2 is preferably provided in the embodiment of FIG. 4 to prevent deformation of support member 24 when it is wedged toward well casing 10 as shown and described.

Figure 5:
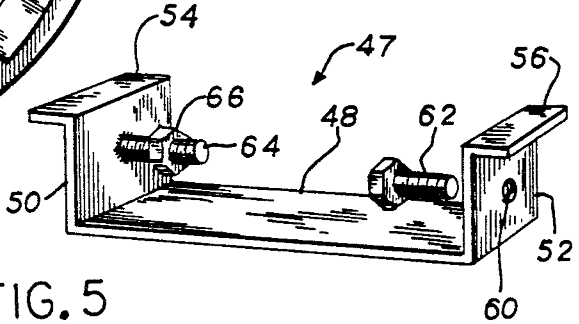
FIG. 5 is a perspective view of another embodiment of the invention, in which the support member extends radially between the suspension members and the ground connection is established with the support member.

Yet another embodiment of the grounding assembly is illustrated at 47 in FIG. 5. In this embodiment, the support member is in the form of a flat connecting bar 48 extending between a pair of suspension members 50, 52. As with the embodiments illustrated and described previously, a pair of tabs 54, 56 are provided at the upper ends of suspension members 50, 52, respectively, for suspending the assembly 47 within well casing 10.

A threaded opening 60 is formed in suspension member 52, and a lock-down bolt 62 is engagable with opening 60. A threaded stud 64 extends inwardly from suspension member 50 and is welded at one end thereto, and a nut 66 is engagable with the threaded portion of stud 64.

If it is necessary to lengthen suspension members 50, 52 for any reason, a reinforcing rod can be connected between the inwardly facing surfaces of suspension members 50, 52. If a reinforcing rod is installed, stud 64 and bolt 62 should be maintained as close as possible to connecting bar 48, being spaced thereabove an amount sufficient to allow access with a wrench or pliers. The reinforcing rod would preferably be located above stud 64 and bolt 62.

In operation, the assembly 47 illustrated in FIG. 5 is inserted into the upper end of well casing 10 in a manner similar to that illustrated in FIG. 1, such that tabs 54 and 56 engage the upper end of well casing 10 and suspend assembly 47 therein. Lock-down bolt 62 is then turned down so that its end engages the inner surface of well casing 10, to firmly secure assembly 47 therewithin. Lock-down bolt 62 establishes an electrical connection between the inner surface of well casing 10 and assembly 47. The end of ground wire 20 is provided with a connector member having an opening of sufficient size to fit over threaded stud 64, and nut 66 is turned down on stud 64 so as to establish a grounding connection between the connector at the end of ground wire 20 and suspension member 50. Alternatively, the embodiment illustrated in FIG. 5 could be used in a manner similar to that shown in FIG. 4, in which a longer lock-down bolt 62 is employed to wedge a connector at the end of ground wire 20 between suspension member 50 and the inner surface of well casing 10.

The embodiment illustrated in FIG. 5 is advantageous in that it can be formed of a one-piece member with reinforcing rod 58 and threaded stud 64 simply welded thereto after the assembly is formed to its configuration as shown.

In any of the illustrated embodiments the grounding device can be constructed to fit into well casings having a variety of internal diameters.

Various alternatives and embodiments are contemplated as being within the scope of the following claims particularly pointing out and distinctly claiming the subject matter regarded as the invention.

I claim:

1. An assembly for connecting a grounding wire to a well casing, comprising:

a removable support member for placement into the wall casing toward its upper end, the support member having a longitudinal dimension less than the internal transverse dimension of the well casing for allowing placement of the support member into the interior of the well casing;

means for fixing the position of the support member relative to the well casing, the means comprising a pair of opposed suspension members each including lateral tabs adapted to rest on top of the well casing for suspending the support member within the well casing; and ground connection means engagable with the support member for establishing a ground connection between the ground wire and the interior of the well casing without connection to the exterior of the well casing.

2. The assembly of claim 1; wherein the support member extends radially between the suspension members.

3. The assembly of claim 2, wherein the ground connection means comprises a threaded member engagable with one of the suspension members and removably engagable with an interior surface of the well casing, to removably secure the support member to the well casing and to establish a ground connection therebetween, and means for connecting a ground wire to the support member.

4. The assembly of claim 3, wherein the means for connecting a ground wire to a support member comprises a threaded stud extending inwardly from the other of the support members for receiving a nut thereon to establish a ground connection to the suspension member.

5. The assembly of claim 1, wherein the position fixing means fixes the vertical position of the support member relative to the well casing, while allowing lateral movement of the support member, and wherein the ground wire is adapted for placement between a surface of the support member and an interior surface of the well casing, and wherein the ground connection means comprises removable wedging means bearing between an interior surface of the well casing and a surface of the support member substantially opposite the location of the ground wire, for wedging the ground wire between the well casing and the support member to establish a grounding connection.

6. The assembly of claim 5, wherein the removable wedging means comprises a threaded member engagable with a threaded opening in the support member, and adapted to bear against the inner wall of the well casing for moving the support member toward the well casing opposite the threaded member.

7. The assembly of claim 1, wherein the position fixing means comprises a plurality of threaded members extending through openings in the support member and removably engagable with the inner surface of the well casing, for maintaining the support member in position relative to the well casing.

8. The assembly of claim 7, wherein the ground connection means comprises a set screw engagable with a threaded opening in the support member, and engagable with the ground wire to establish a ground connection between the ground wire and the inner wall of the well casing.

9. A well, comprising;

a tubular casing;

a pump disposed within the casing toward its lower end;

a ground wire extending from the pump; and grounding means for establishing a grounding connection between the ground wire and the well casing, comprising:

a support member located within the casing toward its upper end, the support member having a longitudinal dimension less than the internal transverse dimension of the well casing for allowing placement of the support member into the interior of the well casing;

means for fixing the position of the support member relative to the well casing, the means comprising a pair of opposed suspension members each including lateral tabs adapted to rest on to of the well casing for suspending the support member within the well casing; and ground connection means engagable with the support member for establishing a ground connection between the ground wire and the interior of the well casing without connection to the exterior of the well casing.

* * * * *